(12) United States Patent
Fiske

(10) Patent No.: US 11,847,640 B2
(45) Date of Patent: *Dec. 19, 2023

(54) PAYMENT SYSTEM FOR AUTHORIZING A TRANSACTION BETWEEN A USER DEVICE AND A TERMINAL

(71) Applicant: Visa Europe Limited, London (GB)

(72) Inventor: Stuart Fiske, Guildford (GB)

(73) Assignee: Visa Europe Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,806

(22) Filed: Jul. 6, 2022

(65) Prior Publication Data
US 2022/0351200 A1    Nov. 3, 2022

Related U.S. Application Data

(63) Continuation of application No. 14/046,840, filed on Oct. 4, 2013, now Pat. No. 11,416,855, which is a (Continued)

(30) Foreign Application Priority Data

Apr. 5, 2011    (GB) ...................................... 1105774

(51) Int. Cl.
*G06Q 20/38*    (2012.01)
*G06Q 20/32*    (2012.01)

(52) U.S. Cl.
CPC ....... *G06Q 20/3827* (2013.01); *G06Q 20/327* (2013.01); *G06Q 20/3229* (2013.01); *G06Q 20/3821* (2013.01); *G06Q 20/3825* (2013.01)

(58) Field of Classification Search
CPC ............... G06Q 20/38; G06Q 20/3827; G06Q 20/3229; G06Q 20/327; G06Q 20/3821; G06Q 20/3825; G06Q 20/326
See application file for complete search history.

(56) References Cited

U.S. PATENT DOCUMENTS 6,367,011 B1 * 4/2002 Lee ...................... G06Q 20/341
380/255
7,840,812 B1 * 11/2010 Levenberg .......... H04L 63/0823
713/176

(Continued)

OTHER PUBLICATIONS

Housley et al., "Internet X.509 Public Key Infrastructure Certificate and CRL Profile", Jan. 1, 1999, pp. 21-22.

(Continued)

*Primary Examiner* — Patrick McAtee
*Assistant Examiner* — Nakia Leffall-Allen
(74) *Attorney, Agent, or Firm* — Kilpatrick Townsend & Stockton LLP

(57) ABSTRACT

Methods, apparatus and computer software are provided for authorizing an EMV transaction between a user device and a point of sale terminal, particularly, but not exclusively, in situations where a secure element is not made available for the deployment of a payment application on the user device. The payment application is instead deployed to a processing environment that is outside of any secure element on the user device. The payment application is associated with a certificate and a corresponding hash. The hash is adapted to be generated on the basis of an application expiration date parameter, which is adapted to comprise data indicative of an expiration date of day level granularity associated with the certificate. During processing of the EMV transaction, the point-of-sale terminal verifies the hash, thereby establishing the authenticity of the application expiration date, and hence the validity of the certificate.

19 Claims, 9 Drawing Sheets

Related U.S. Application Data continuation of application No. PCT/GB2012/050738, filed on Apr. 2, 2012.

(56) References Cited

U.S. PATENT DOCUMENTS

| | | | |
|---|---|---|---|
| 10,140,598 B2 | 11/2018 | Faith | |
| 11,416,855 B2* | 8/2022 | Fiske | G06Q 20/326 |
| 2002/0007320 A1 | 1/2002 | Hogan et al. | |
| 2004/0236672 A1* | 11/2004 | Jung | G06Q 40/03 705/38 |
| 2005/0156026 A1* | 7/2005 | Ghosh | G06Q 20/341 235/380 |
| 2008/0165951 A1 | 7/2008 | Somers et al. | |
| 2009/0050696 A1 | 2/2009 | Wang | |
| 2009/0077104 A1 | 3/2009 | Sheets | |
| 2009/0198618 A1 | 8/2009 | Chan et al. | |
| 2010/0153267 A1* | 6/2010 | Ghaidan | G07F 7/127 705/41 |
| 2011/0038481 A1* | 2/2011 | Modave | G06Q 20/3552 380/277 |

OTHER PUBLICATIONS

Application No. PCT/GB2012/050738, International Preliminary Report on Patentability, dated Jul. 19, 2013, 21 pages.

Application No. PCT/GB2012/050738, International Search Report and Written Opinion, dated Sep. 14, 2012, 7 pages.

"EMV Integrated Circuit Card Specifications for Payment Systems", EMVCo, LLC, Book 2, V 4.1, May 2004, 187 pages.

"EMV Integrated Circuit Card Specifications for Payment Systems", EMVCo, LLC, Book 3, V 4.1, May 2004, 237 pages.

U.S. Appl. No. 14/046,840, "Corrected Notice of Allowability", dated Apr. 28, 2022, 3 pages.

U.S. Appl. No. 14/046,840, Final Office Action, dated Aug. 15, 2019, 28 pages.

U.S. Appl. No. 14/046,840, Non Final Office Action, dated Dec. 19, 2018, 22 pages.

U.S. Appl. No. 14/046,840, Non-Final Office Action, dated Sep. 20, 2021, 11 pages.

U.S. Appl. No. 14/046,840, Notice of Allowance, dated Apr. 8, 2022, 15 pages.

* cited by examiner

PAYMENT SYSTEM FOR AUTHORIZING A TRANSACTION BETWEEN A USER DEVICE AND A TERMINAL

CROSS-REFERENCE TO RELATED APPLICATIONS

This application is a continuation of U.S. application Ser. No. 14/046,840, filed on Oct. 4, 2013, which is a continuation under 35 U.S.C. § 120 of International Application No. PCT/GB2012/050738, filed Apr. 2, 2012 (and published in the English language as International Publication Number WO 2012/136987), which claims priority to GB Application No. 1105774.2, filed Apr. 5, 2011. Each of the above-referenced applications is hereby incorporated by reference in its entirety.

BACKGROUND OF THE INVENTION

Field of the Invention

The present invention relates to the field electronic payment systems and provides methods of and systems for authorizing an EMV payment transaction between a user device and a point-of-sale terminal.

Description of the Related Technology

Electronic payment systems facilitate the electronic transfer of money from one account to another through computer based systems. To allow widespread use of electronic payment systems, integrated circuit cards (ICCs) provisioned with payment applications are commonly used; these provide an alternative to cash when making purchases. An ICC is a portable card containing embedded integrated circuits. ICCs are typically issued by financial institutions, commonly known as issuing banks or issuers, to their customers. A payment application runs on the ICC and contains information related to the account held by the customer with the issuing bank.

FIG. 1 illustrates the components of a conventional electronic payment system. An ICC 102, issued by issuing bank 100, enables a user to interact with a terminal 104 at a point of sale (PoS) in order to make a purchase from a merchant. The terminal 104 subsequently reports the transaction details to the merchant's bank 106, commonly known as the acquiring bank. The transaction is later settled between the issuing bank 100 and the acquiring bank 106, and the proper transfer of funds is arranged.

ICC 102 may interface with PoS terminal 104 via contact or contactless technologies. Contact ICCs are powered by the PoS terminal, and conform to the ISO/IEC 7810 and ISO/IEC 7816 series of standards. Contactless cards may be self-powered, or powered inductively by the PoS terminal and conform to the ISO/IEC 14443 or ISO/IEC 15693 standards.

Before the transaction is completed, the PoS terminal 104 must ensure that the presented ICC 102 is both genuine, and authorized to complete the transaction. Authentication of ICCs and authorization of transactions are handled according to transaction protocols, which ensure the interoperability of a range of ICCs and PoS terminals.

Many electronic payment systems use the EMV (Europay®, Mastercard®, Visa®) transaction protocols, as defined for example in the EMV 4.2 Specifications or the EMV Contactless Specifications for Payment Systems, which are publicly available and published by EMVCo LLC. These protocols are referred to herein as simply "EMV".

In order for an ICC to prove its authenticity to a PoS terminal, the ICC is equipped with a number of data parameters, such as unique certificates and secret keys that allow validation to occur without jeopardizing the secrecy of the data. These data parameters are collectively known as payment keys.

The integrated circuitry embedded into ICCs provisioned with payment applications typically consist of tamper resistant processing and memory elements, which allow secret data parameters, such as a number of the payment keys described above, to be stored on the card while maintaining a high degree of confidence that the data cannot be externally obtained.

Tamper resistance may be provided by the use of a secure cryptoprocessor on the ICC, which stores program instructions and data in an encrypted form, only decrypting them inside the processor when they are executed. Further, the cryptoprocessor may be embedded with packaging employing physical security measures, for example causing data to be wiped from the storage if it is probed by an external source. This tamper resistant processing environment is commonly referred to as a secure element.

Recently, attempts have been made to incorporate payment card functionality into other devices. Most notably, there have been efforts to deploy payment applications onto user devices, such as mobile telephones, equipped with short range wireless technology, such as a Near Field Communications (NFC) antenna, in order to emulate a contactless payment card. The NFC communication protocol is standardized in ISO/IEC 18092.

However, like standard payment cards, these devices have conventionally required a secure element to store and process the necessary secret data, and maintain the level of security required to ensure the secrecy of the data. Secure elements may be embedded as part of the device hardware, on a removable storage card such as a Secure Digital (SD) card, or in the case of a mobile telephony device, incorporated into the subscriber identity module (SIM) card. Other known methods of providing a secure element have included deploying an external secure element accessible via a peripheral interface, such as via a Universal Serial Bus (USB) interface, or via the Bluetooth® wireless communication protocol.

However, there are several reasons why a secure element may not be available for use by a payment application. Firstly, the device on which the payment application is implemented may not be equipped with such a secure element (or an interface by which an external secure element may be accessed). Secondly, the payment application may not be permitted access to the secure element provided, perhaps because the payment application was deployed to the device subsequently to the secure element.

In the case of a mobile telephony device, it is possible to deliver applications or updates to a SIM "over-the-air" via use of the SIM Application Toolkit (STK). However the provisioning of applications in this way requires the cooperation of the mobile network operator and a compliant SIM and mobile telephony device, which may not always be possible.

Hence, it is an objective of the present invention to provide improved methods for providing payment card functionality on a user device, while minimizing any inconvenience to the user of the device and without requiring modification of the EMV infrastructure, or existing PoS hardware.

A brief summary of the relevant conventional methods for processing electronic payments will now be provided to assist in understanding embodiments of the invention.

Data Authentication

EMV provides for the authentication of an ICC card's credentials through offline data authentication. Offline data authentication is carried out during EMV payment transaction processing, and is termed offline as there is no communication between the PoS terminal and the acquiring or issuing banks. The purpose of offline data authentication is to verify that the ICC is presenting a valid set of credentials, and uses a layered public key certification scheme. A certification scheme uses digital signatures to guarantee signed data, and in particular a public key contained within.

Signing is performed on the basis of an asymmetric encipherment mechanism, in which data that is enciphered, or 'signed', through the use of a private key can be deciphered using a corresponding public key, without requiring or implying any knowledge of the original private key. Hence, signed data that can be deciphered with a given public key can be safely assumed to have been encoded by the corresponding private key. EMV approves the use of the RSA algorithm as a suitable asymmetric encipherment mechanism, as described in R. L. Rivest, A. Shamir, and L. Adleman—"A method for obtaining digital signatures and public key cryptosystems", Communications of the ACM, vol. 21, 1978, pp. 120-126, and proposes the use of Elliptic Curve Cryptography for future specifications.

As mentioned above, the certification scheme utilized in EMV is a layered scheme, where a key obtained from a first certificate is used to decipher a second certificate, and so on. All of the data necessary for offline data verification is obtained by the terminal in response to issuing READ RECORD commands to the ICC or other commands such as GET PROCESSING OPTIONS (GPO). The READ RECORD commands are issued at the start of the transaction processing or during the transaction processing and are used to read all of the transaction related data parameters from the ICC. Those parameters that are required during transaction processing are listed in an Application File Locator (AFL). The AFL is a data file stored on the ICC that lists all data records stored on the ICC that may be required during transaction processing.

In response to receiving the READ RECORD commands, or other commands (such as the aforementioned GPO), the ICC sends all of the records that are identified in the AFL to the terminal. The records relevant to offline data authentication include a Certification Authority (CA) Public Key Index, an Issuer Public Key Certificate, the Primary Account Number (PAN) and Signed Static Application Data or an ICC Public Key Certificate depending on the offline data authentication method being employed.

EMV provides several methods of offline data authentication, the choice of which depends on the capabilities of both the ICC and the PoS terminal. The simplest method is Static Data Authentication (SDA), which is for use with ICCs that do not support digital signature generation. Digital signature generation is required by EMV for contactless transactions; therefore SDA is not permitted for use with contactless EMV transactions.

EMV also provides methods that do support dynamic signature generation, of which Dynamic Data Authentication (DDA) is the simplest. Additionally, EMV provides a method called Fast DDA (fDDA) which is optimized for contactless transactions, and a method called CDA, which combines DDA with the subsequent step of Application Cryptogram Generation (described below), in order to allow both operations to be completed in parallel.

FIG. 2 illustrates an exemplary DDA flow diagram according to the known EMV transaction protocols.

At step 200, the terminal reads the application data from the ICC by issuing READ RECORD commands as described above.

At step 202, the terminal uses the CA Public Key Index to identify which CA's Private Key has been used to sign the Issuer Public Key Certificate, and hence which corresponding CA Public Key is required to decipher the Issuer Public Key Certificate. The CA is a highly secure cryptographic facility that signs an Issuer's Public Keys in order to guarantee their authenticity. The CA must be trusted by both the issuing bank and the acquiring bank in order to provide confidence in the signed data.

The terminal maintains a local store of Certification Authority Public Keys, and uses the Certification Authority Public Key Index obtained from the ICC to identify the appropriate one to use in relation to the payment application. Having identified the appropriate CA Public Key, the terminal uses this to decipher the Issuer Public Key Certificate at step 204. Decipherment is performed according to the recovery mechanism appropriate to the encipherment scheme that was used to sign the Issuer Public Key Certificate. Since EMV approves the use of the RSA algorithm, decipherment is performed according to the appropriate RSA recovery mechanism on the basis of the obtained public key.

The data contained in the Issuer Public Key Certificate includes the Issuer Public Key and associated data, such as an Issuer Identifier, Certificate Expiration Date, Certificate Serial Number, Issuer Public Key Length, Issuer Public Key Exponent Length, and a Hash Result. All of these data fields are signed by the CA Private Key, and hence the validity of the information is guaranteed by the CA.

At step 206, the terminal makes a number of checks to determine whether the Issuer Public Key Certificate was deciphered properly, and whether the deciphered information is valid. Firstly the terminal checks the contents of the deciphered header, trailer and format data parameters against known expected values. A hash algorithm is then applied to the concatenation of the data fields in the Issuer Public Key Certificate (excluding the Hash Result parameter), the Issuer Public Key remainder and Issuer Public Key Exponent. The result of the hash algorithm is then compared to the Hash Result value provided in the Issuer Public Key Certificate.

A hash algorithm is a one-way mathematical operation that is used to generate a fixed size result on the basis of a large or variably sized data input. The result depends on the entire data input, and it is computationally difficult to determine input data that would produce a given result. EMV recommends the use of the Secure Hash Algorithm (SHA-1) as standardized in ISO/IEC 10118-3.

The terminal then checks the Issuer Identifier recovered from the Issuer Public Key Certificate against first 3-8 digits of the Primary Account Number read from the ICC. The terminal also checks the Issuer Public Key Certificate Expiration Date (expressed in terms of an expiration month and an expiration year) against the current date to make sure that the last day of the expiration month has not passed, and that the Issuer Public Key Certificate is still valid.

If any of these checks fail, then the offline data authentication process has failed. However, if all of these checks are passed, then the terminal has obtained and verified the Issuer Public Key, which is used to decipher the ICC Public Key Certificate at step 208.

The data contained in the ICC Public Key Certificate includes the ICC Public Key and associated payment application credentials, including the PAN, Certificate Expiration Date, Certificate Serial Number, ICC Public Key Length, ICC Public Key Exponent Length, and a Hash Result. All of these data fields are signed by the Issuer Private Key, and hence the validity of the information is guaranteed by the Issuer, whose identity has in turn been guaranteed by the CA.

At step 210, the terminal makes a number of checks to determine whether the ICC Public Key Certificate was deciphered properly, and whether the deciphered information is valid. Firstly the terminal checks the contents of the deciphered header, trailer and format data parameters against known expected values.

A hash algorithm is then applied to the concatenation of the data fields in the ICC Public Key Certificate (excluding the Hash Result), the ICC Public Key Remainder, the ICC Public Key Exponent and a set of static data to be authenticated, which is made up of a selection of other data files stored on the ICC and retrieved at the start of transaction processing, or during the transaction processing, using the READ RECORD command. The result of the hash algorithm is then compared to the Hash Result value provided in the ICC Public Key Certificate.

The data records that make up the static data to be authenticated are indicated in the AFL by a specific tag value. Only those records which are tagged as being used in offline data authentication are processed. Additional data elements can be identified by an optional Static Data Authentication Tag List contained on the ICC. Including this static data in the hash input allows these extra data parameters to be authenticated by a verified hash result.

The terminal then checks the PAN from the ICC Public Key Certificate against the PAN as read from the ICC card in response to the READ RECORD command. Also, the ICC Certificate Expiration Date (expressed in terms of an expiration month and an expiration year) is checked against the current date to make sure that the last day of the expiration month has not passed, and that the ICC Public Key Certificate is still valid.

If any of these checks fail, then the offline data authentication process has failed. However, if all of these checks are passed, then the terminal has obtained and verified the ICC Public Key, which is then used to confirm that the ICC is equipped with the ICC Private Key.

This is achieved by instructing the ICC to generate a digital signature by signing a specified data set using the ICC Private Key. The result is called the Signed Dynamic Application Data. The data that must be signed by the ICC is defined in a Dynamic Data Object List (DDOL). The ICC may contain a DDOL, but if not, a default DDOL is provided by the terminal. Some data defined in the DDOL must be provided by the terminal, and other parameters may be read from the ICC. Any DDOL must include the Unpredictable Number parameter, which is generated by the terminal. Including the unpredictable number ensures that the data to be signed cannot be predicted, and therefore that the resulting Signed Application Data cannot be spoofed by pre-computing the result.

At step 212, the terminal requests the ICC to apply its digital signature by sending an INTERNAL AUTHENTICATE command. The INTERNAL AUTHENTICATE command includes a data field which contains the necessary terminal sourced data which is to be signed by the ICC.

The Signed Dynamic Application data is transmitted to the terminal at step 214. At step 216, the terminal uses the previously obtained ICC Public Key to decipher the Signed Dynamic Application Data. The data contained in the Signed Dynamic Application Data includes the Dynamic Data and a Hash Result.

Again, at step 218 the terminal makes a number of checks to determine whether the Signed Dynamic Application Data was deciphered properly, and whether the deciphered information is valid. Firstly the terminal checks the contents of the deciphered header, trailer and format data parameters against known expected values.

A hash algorithm is then applied to the concatenation of the data fields in the Signed Dynamic Application Data (excluding the Hash Result) and the dynamic data to be authenticated. The result of the hash algorithm is then compared to the Hash Result value provided in the Signed Dynamic Application Data.

If any of these checks fail, then the offline data authentication process has failed. However, if all of these checks are passed, then the terminal has verified that the ICC does have access to the ICC Private Key, and DDA is successful.

If alternatively SDA is used, the verification steps are the same as shown in FIG. 2 up until step 204, after which the Issuer Public Key is instead used to decipher the Signed Static Application Data. The data contained in the Signed Static Application Data includes a Data Authentication Code and a Hash Result. All of this data is signed by the Issuer Private Key, and hence the validity of the information is guaranteed by the Issuer, whose identity has in turn been guaranteed by the CA.

The terminal again makes a number of checks to determine whether the Signed Static Application Data was deciphered properly, and whether the deciphered information is valid. Firstly the terminal checks the contents of the deciphered header, trailer and format data parameters against known expected values.

A hash algorithm is then applied to the concatenation of the data fields in the Signed Static Application Data, and the set of static data to be authenticated identified by the AFL as described above. The result of the hash algorithm is compared to the Hash Result field obtained from the Signed Static Application Data. Including the static data in the hash input allows these extra data parameters to be authenticated by a verified hash result.

If CDA is used instead of DDA, then the verification steps are the same as in FIG. 3 up until step 210, after which the terminal requests an Application Cryptogram by sending a GENERATE AC command to the ICC (as described below), but also requests it to be signed with a CDA signature. This allows the digital signature to be verified at the same time as processing the Application Cryptogram.

According to some PoS terminal implementations, where only support for online authorization is provided, the step of offline data authentication may optionally be omitted, since the transaction will always be sent online for authorization and the responsibility for authentication can also be passed to the issuing bank.

Application Cryptogram Generation

EMV provides for transaction authorization through the generation of application cryptograms. Depending on which options are used from the various EMV specifications, there are several mechanisms available for application cryptogram generation. The generation of application cryptograms will be described herein as per the EMV 4.2 specifications, however it will be clear to the person skilled in the art that alternative mechanisms are also suitable. Throughout the transaction processing, the success or failure of certain checks and actions, such as those described above in relation to offline data authentication, can be recorded in a Terminal Verification Results string (TVR).

The TVR is reviewed during Terminal Action Analysis, and on the basis of its contents, the terminal makes a preliminary decision about whether the transaction should be approved offline, authorized online, or declined. Approval offline comprised the terminal deciding that the transaction can take place without seeking express permission from the Issuing Bank. Online authorization comprises sending details of the transaction to the Issuing Bank for authorization before approving the transaction. In some circumstances, the terminal will decline the transaction offline, before seeking authorization from the Issuing Bank.

The decision of the appropriate course of action for the terminal to take is made on the basis of Terminal Action Codes (TAC) and Issuer Action Codes (IAC). TACs are programmed into the terminal by the acquiring bank, and define the circumstances under which a transaction should be approved offline, authorized online, or declined. IACs are deployed into the ICC by the issuing bank, and also define a set of circumstances under which a transaction should be approved offline, authorized online, or declined. The terminal uses both the TACs and the IACs in order to make a preliminary decision on how to process the transaction.

FIG. 3 illustrates an exemplary Application Cryptogram Generation command flow diagram according to the EMV transaction protocols.

The flow begins at step 300 by comparing the contents of the TVR to the TACs stored at the terminal and the IACs retrieved from the ICC. On the basis of the comparison, the terminal makes a preliminary decision about whether the transaction should be approved offline, authorized online, or declined in step 302.

Depending on the result of the decision made at step 302, the terminal requests a specific type of Application Cryptogram to be generated by sending a GENERATE AC command to the ICC. If the terminal decides to decline the transaction offline, the GENERATE AC command requests Application Authentication Cryptogram (AAC) in step 304. If the terminal decides to attempt to authorize the transaction online, the GENERATE AC command requests an Authorization Request Cryptogram (ARQC) in step 306. If the terminal decides to approve the transaction offline, the GENERATE AC command requests a Transaction Certificate (TC) in step 308.

In response to the GENERATE AC command issued by the terminal, the ICC may perform its own risk management in the form of Card Action Analysis. Card action analysis is performed on the basis of parameters determined by the issuer and stored on the ICC. The result of the Card Action Analysis can only elect an authorization method the same as determined by the terminal or stricter.

If the terminal decides to reject the transaction offline by requesting an AAC as per step 304, the ICC must respond with an AAC in step 310. Any other response from the ICC will cause the transaction processing to fail.

If the terminal decides to attempt to send the transaction online for authorization by the issuing bank by requesting an ARQC as per step 306, as a result of the Card Action Analysis in step 312 the ICC may decide to respond with an ARQC in step 314 as requested, or elect to decline the transaction offline by responding with an AAC in step 310.

A response from the ICC comprising a TC will cause the transaction processing to fail.

If the terminal decides to allow the transaction offline by requesting a TC as per step 308, as a result of the Card Action Analysis in step 312 the ICC may decide to respond with a TC in step 316 as requested, elect to send the transaction online for authorization by the issuing bank by responding with an ARQC in step 314, or elect to decline the transaction by responding with an AAC in step 310.

If the ICC responds with an ARQC, the terminal attempts to send this to the issuing bank for authorization in step 318. If the result of the online authorization procedure is to reject the transaction, the terminal requests an AAC in step 320 by sending a second GENERATE AC command, and the AAC is returned by the ICC in step 310. If the result of the online authorization procedure is to authorize the transaction, the terminal requests a TC in step 322 by sending a second GENERATE AC command, and the AAC is returned by the ICC in step 316.

Alternatively, if the online authorization procedure cannot be completed, the terminal reverts to a default method as defined in the TAC/IAC, by sending a second GENERATE AC command which either requests an AAC as per step 320, which is returned by the ICC in step 310, or a TC in step 322, which is returned by the ICC in step 316.

Once the ICC has responded with either an AAC or a TC as per steps 310 or 316 respectively, the Application Cryptogram Generation command flow is completed.

In order to respond to a GENERATE AC command issued by the terminal, the ICC must produce an Application Cryptogram. An Application Cryptogram is produced on the basis of data sent to the ICC in the data field of the GENERATE AC command. The data to be used is specified in a Card Risk Management Data Object List (CDOL), which is stored in the ICC. The ICC stores two CDOLs, one for use with the first GENERATE AC command issued in a given transaction, and the other to be used if a second GENERATE AC command is issued.

The encipherment of the application data and the generation of the application cryptogram is preformed on the basis of a 16-byte ICC Session Key. An ICC Session Key is a unique key generated by the ICC which is only valid for use with one transaction. Each ICC Session Key is derived from a 16-byte unique ICC Master Key, deployed securely on the ICC by the issuing bank, and a 2-byte Application Transaction Counter (ATC). The ATC is employed as diversification data, which ensures variation between the ICC Session Keys used in each transaction.

FIG. 4 illustrates the process of deriving a Session Key from a unique ICC Master Key 400 according to the EMV protocols.

ATC 402 is used to create left diversification data 404 by appending it with hexadecimal data value "F0" and padding the remaining 5 bytes with zeros. Similarly, right diversification data 406 is generated by appending the ATC value with hexadecimal data value "0F" and padding the remaining 5 bytes with zeros.

The Session Key is generated in two halves by using the Triple Data Encryption Standard (3DES) algorithm. 3DES is specified in ISO/IEC 18033-3, and is used to encipher an 8-byte input into an 8-byte cipher-text output using a 16-byte secret key.

The leftmost 8-bytes of the session key 408 are generated by applying the 3DES algorithm 410 to the left diversification data 404, using the ICC Master Key 400 as the secret key. Similarly, the rightmost 8-bytes of the session key 412 are generated by applying the 3DES algorithm 414 to the right diversification data 406, using the ICC Master Key 400 as the secret key.

The leftmost 8-bytes of the session key 408 and the rightmost 8-bytes of the session key 412 are then concatenated to form the ICC Session Key 416.

The ICC Session Key can then be used to generate an application cryptogram. How the Session Key is used to generate the application cryptogram is specific to the payment system being implemented.

If CDA is selected as the method for offline data authentication (as described previously), the terminal will request application cryptograms to be signed by the ICCs digital signature, allowing offline data authentication to be performed simultaneously with the steps described above.

The commands used in application cryptogram generation may differ from those described above depending on which of the options form the various EMV specifications are used. For example, instead of using GENERATE AC, the required payment processing may be incorporated into an alternative command, such as GPO.

United States patent application US 2005/0156026 A1 describes conducting EMV payment transactions wirelessly using a mobile terminal.

SUMMARY

In accordance with embodiments of the present invention, there is provided a method, apparatus and computer software for authorizing an EMV transaction according to the appended claims.

More specifically, in a first aspect of the present invention, there is provided a method for authorizing an EMV payment transaction between a user device and a point-of-sale terminal, the user device being configured with a payment application, the payment application being associated with a certificate and a hash corresponding to the certificate, the hash being generated on the basis of an application expiration date parameter, the application expiration date parameter comprising data indicative of an expiration date associated with the certificate, such that the hash is generated on the basis of an expiration day, an expiration month and an expiration year of the certificate, the method comprising:

responsive to the point-of-sale terminal receiving the certificate, the point-of-sale terminal verifying the hash, thereby establishing the authenticity of the application expiration date parameter, and hence the validity of the certificate; and selectively authorizing the payment application for conducting the transaction.

A payment application may relate to software configured so as to be able to control communication with a point-of-sale terminal in accordance with the EMV transaction protocols. A user device may relate to a portable electronic device comprising computational hardware. One example of a user device is a mobile telephony device, such as a smart phone.

The certificate may relate to the ICC Public Key Certificate as described by the EMV transaction protocols, and required for Dynamic Data Authentication (DDA), and Combined DDA (CDA). The ICC Public Key Certificate is signed by the Issuer Private Key, thus preventing manipulation of its contents without knowledge of the Issuer Private Key. The hash may relate to the Hash Result parameter provided as a field within the ICC Public Key Certificate in accordance with the EMV transaction protocols and generated on the basis of the ICC Public Key Certificate data, and a set of static data obtained from the ICC as described previously.

By utilizing the application expiration date parameter to represent an expiration date associated with the certificate, embodiments of the present invention are able to cause the certificate to expire on a specific day, in contrast to the month-level granularity provided by the prior art. Further, by generating the hash on the basis of the application expiration date parameter, embodiments of the present invention ensure that that application expiration cannot be modified without generating a new certificate and hash, which would require knowledge of the Issuer Private Key, which is known only to the issuing bank.

By configuring the certificate and hash to cause the payment application to become invalid after a short amount of time, embodiments of the present invention are able to reduce the risk associated with a successful attack on the payment application. By reducing the risk associated with a successful attack on the payment application, embodiments of the present invention facilitate the provisioning of the payment application in a manner that does not require the use of the hardware security features necessary for the provisioning of conventional payment applications, such those provided by a secure element.

Preferably, the user device comprises a first processing portion and a second processing portion, the first processing portion comprising a first application environment within a secure element and the second processing portion comprising a second application environment external to the secure element, and wherein the second processing portion comprises the payment application A processing portion may relate to a combination of conventional computational components, such as a central processing unit, random access memory and read only memory. An application environment may relate to a logical view of a processing portion in which an application, made up of a combination of software instructions, may execute. A secure element may provide a processing portion and application environment with additional hardware security features, such as tamper resistance, which may be provided through the use of a secure cryptoprocessor. One example of a secure element is that provided by a Subscriber Identity Module (SIM) card with respect to a mobile telephony device.

Preferably, and responsive to a predetermined criterion being satisfied, a given the certificate and a given the hash is provisioned to the user device.

The predetermined criterion may comprise the user device sending a request for a new certificate and hash or a predetermined period of time elapsing since the provisioning of the last certificate and hash. The provisioning of the further session keys may take place via a packet switched communications network such as the internet, a circuit switched communications network such as a mobile telephony network, or a combination of both.

Preferably, the payment application is further configured with an issuer action code, the issuer action code being transmitted to the point-of-sale terminal and the selective authorization being further performed on the basis of the issuer action code.

An issuer action code may relate to instructions included in the payment application by the issuing bank that define a set of conditions according to which the point-of-sale terminal may decide how to authorize a given transaction, as described previously.

The user device can communicate with the point-of-sale terminal using short range wireless technologies, for example a radio frequency communication protocol such as a Near Field Communications standard.

According to further aspects of the present invention there is provided a user device adapted to process an EMV transaction in conjunction with a point-of-sale terminal according to the aforesaid method and a computer program, or suite of computer programs, which, when executed on the user device, cause the user device to perform the aforesaid method.

While embodiments of the invention are suitable for processing environments that include a secure element, it will be appreciated that embodiments of the invention can be implemented in an environment that does not have a secure element, as the generation and processing of certificates and hash values in accordance with the described embodiments is independent of the existence of a secure element.

Preferably, the user device is arranged to conduct a further EMV transaction that is authorized by an issuing bank, the payment application having a first operative state in which the payment application is enabled to conduct the further EMV payment transaction, and a second operative state, different to the first operative state, wherein the payment application is responsive to receipt of a session key generated on the basis of a ICC Master Key held by the issuing bank, whereby to be configured into the first operative state and thereafter is arranged to perform an authorization process, the authorization process comprising the steps of:

generating the application cryptogram on the basis of the received session key; and transmitting the generated application cryptogram to the point-of-sale terminal for verification thereof by the issuing bank and authorization of the further EMV payment transaction.

The ICC Master Key is a unique key associated with the payment application, from which session keys may be derived. Session keys are keys required during the processing of an EMV transaction and, in at least one embodiment, each key is valid for use only with a single transaction. An application cryptogram is a set of data enciphered using a session key by a payment application, and is required by the point-of-sale terminal during the processing of an EMV transaction.

Thus, in contrast to known payment transaction configurations, the ICC Master Key is held at the issuing bank, rather than by a payment application on a user device. Further, transactions are authorized on the basis of a session key derived from the ICC Master Key by the issuing bank, these session keys being sent to the user device. As a result, embodiments of the present invention are able to further reduce the risk associated with a successful attack on the payment application, since a successful attack against the payment application would yield payment credentials valid only for a single, or at most a limited number of, transactions, and hence the severity of such an attack is significantly reduced.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 5:
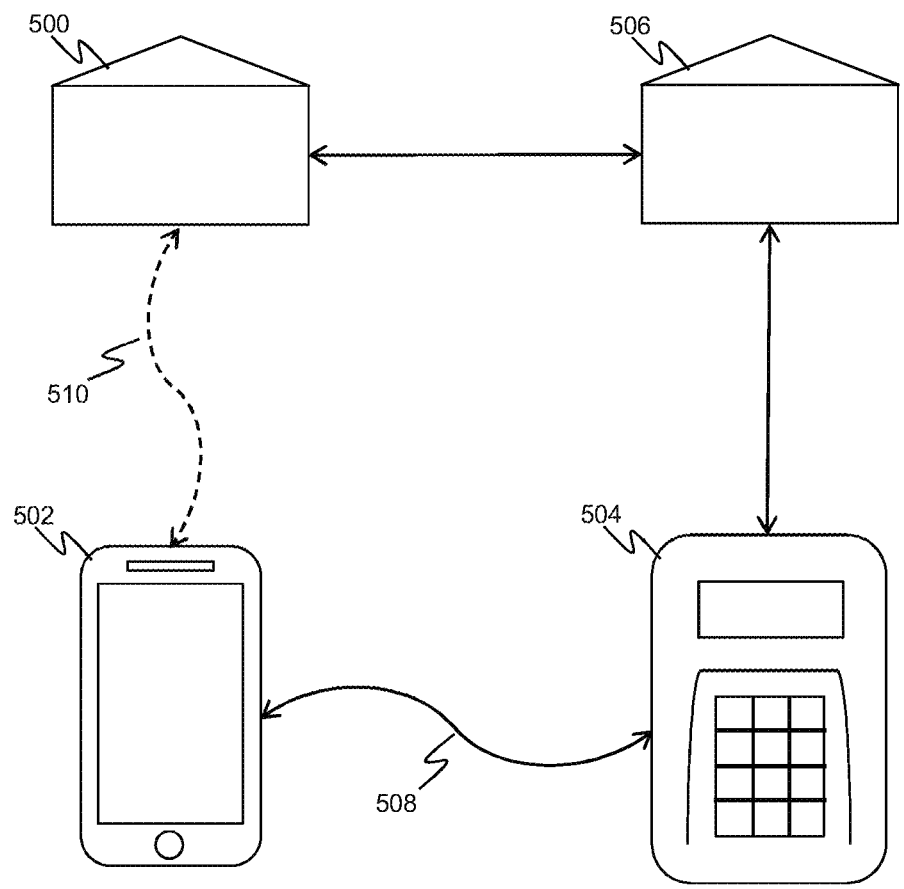
FIG. 5 shows the components of an electronic payment system according to an embodiment of the present invention.

FIG. 5 illustrates the components of an electronic payment system according to an embodiment of the present invention.

User device 502 is provisioned with a payment application associated with issuing bank 500. The user of device 502 can interact with a terminal 504 at a PoS via user device 502 in order to make a purchase from a merchant. The PoS terminal 504 can communicate with the acquiring bank 506, and the transaction is later settled between the issuing bank 500 and the acquiring bank 506, once the proper transfer of funds has been arranged.

According to embodiments of the invention, the user device 502 can communicate with the PoS terminal via contactless communication interface 508. This may be via a short range wireless communication protocol, such as NFC.

User device 502 is further capable of communicating with issuing bank 500 via communications interface 510. The communication medium used for communications between the issuing bank 500 and user device 502 depends on the capabilities of the user device. User device 502 may communicate with issuing bank 500 via the internet. Alternatively, if user device 502 is a mobile telephony device, the user device may communicate with issuing bank 500 via the mobile telephony network.

Figure 6:
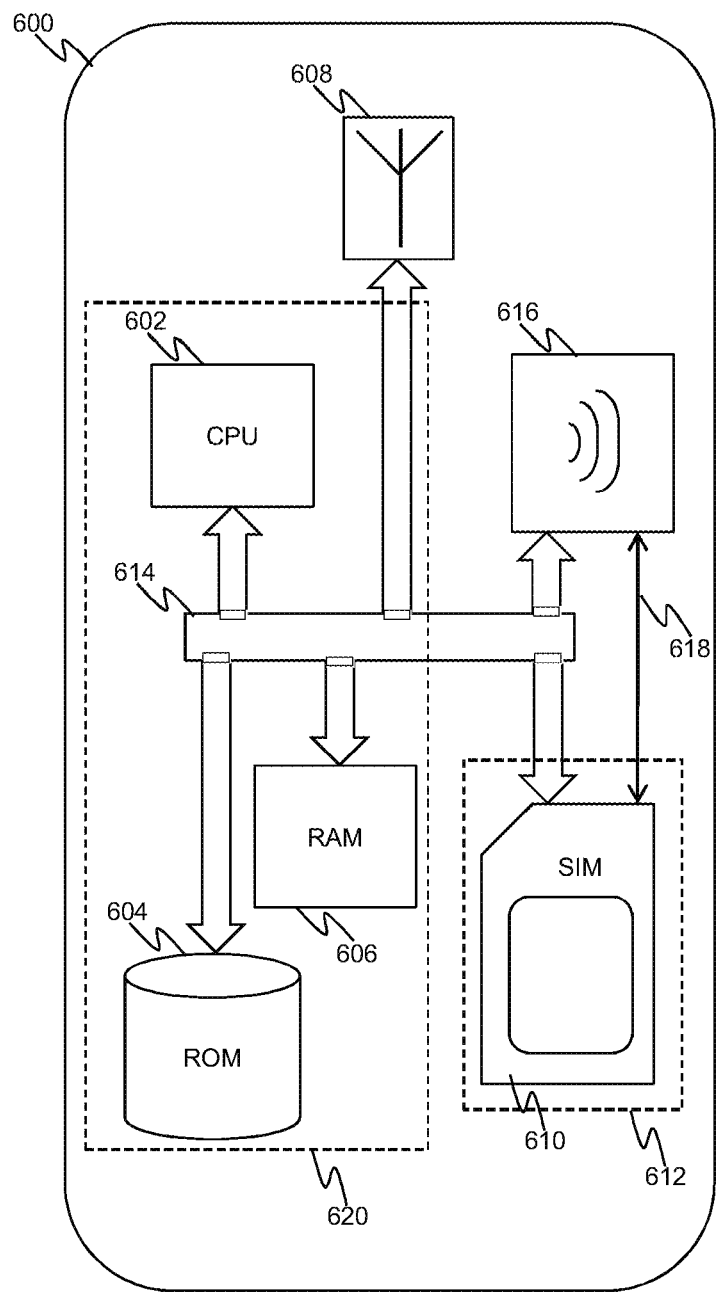
FIG. 6 shows a functional block diagram of a user device configured according to an embodiment of the present invention.

FIG. 6 illustrates exemplary components of a user device according to embodiments the present invention wherein the user device comprises a mobile telephony device.

User device 600 comprises conventional computational hardware including a processing portion 602, read only memory 604, random access memory 606, and other standard hardware such as an input/output controller, display controller etc. (not shown). User device 600 also comprises specific mobile telephony hardware including telephony antenna 608, and SIM card 610. The SIM card 610 constitutes a secure processing environment on the user device, also known as secure element 612, and incorporates additional security measures such as tamper resistance. The components describe above are accessible to processing portion 602 via an internal communication structure, such as system bus 614. The operation and interaction of these components is well known in the art and therefore will not be covered in further detail here.

User device 600 also includes short range wireless communications hardware, including short range wireless antenna 616, which can be used to make contactless communication with a PoS terminal, and may be an NFC antenna.

Typically, where short range wireless antennas have hitherto been provided in known mobile telephony devices, they have been controlled by the SIM 610, via a dedicated communication channel 618, separate to system bus 614. The dedicated communication channel 618 may, for example, use the Single Wire Protocol for communication.

According to embodiments of the present invention, the short range wireless antenna is accessible from an area outside of secure element 612, hereafter known as the standard application environment 620, for example via the system bus 614.

Standard application environment 620 also comprises a payment application deployed on device 600. The payment application may be installed on the standard application environment at the time of manufacture of the device, or under the supervision of the issuing bank. Alternatively the payment application may be installed by the end user of the device. An end user may install the application by downloading the installation files to the user device, for example via the internet. Alternatively a user may install the application by downloading the installation files first to another device, such as a personal computer, and then sideloading the files onto to the user device, for example via a USB connection. Alternatively still, a user may obtain the installation files by accessing an application portal on the user device, such as the Apple® AppStore™, or the Android Market™, which facilitate an integrated download and installation of application files. The download of installation files facilitated by an application portal may be provided via an available internet connection, or over-the-air provisioning (OTAP).

According to embodiments of the invention, the payment keys, which are necessary for the use of the payment application, are provided subsequently to the installation of the payment application, under the control of the issuing bank. Equipping the user device with the payment keys in this manner has the effect of activating the payment application, thereby associating it with an account at the issuing bank, and enabling it to conduct EMV payment transactions. The payment keys may be stored in an encrypted state in a memory portion associated with the standard application environment such as in read only memory 604 or an alternative persistent memory, using, for example, the Advanced Encryption Standard (AES). The key used to encrypt and decrypt such payment keys may be stored in persistent memory on device 600, or may be derived from an input received from the user, such as a password entered on the device, a pattern entered on the screen or by the entry of biometric data such as a fingerprint scan or facial feature recognition.

According to some embodiments of the invention, standard application environment 620 may further comprise a Trusted Execution Environment (TEE), for example as outlined by Global Platform Inc. in "TEE System Architecture", available from www.globalplatform.org, and other related specifications. A TEE enables the safe execution of authorized software or applications by storing and processing data in a logically isolated manner, causing the various applications to be logically segregated from each other. A TEE provides protection from attacks against protected data by malicious software, but does not provide the physical protection of a secure element, such as tamperproof processing and memory components. Where a TEE is available on device 600, at least a part of the payment application may be stored and/or executed in the TEE. Additionally or alternatively, the payment keys may be stored in the TEE. Where the payment keys are stored in an encrypted state outside of the TEE, the key to that is used to encrypt and decrypt the payment keys may be stored in the TEE.

In addition, the payment application is configured such that the lifetime of the ICC Public Key Certificate, that is the amount of time before the contents of the ICC Public Key Certificate renders the payment application invalid, is restricted.

Figure 7:
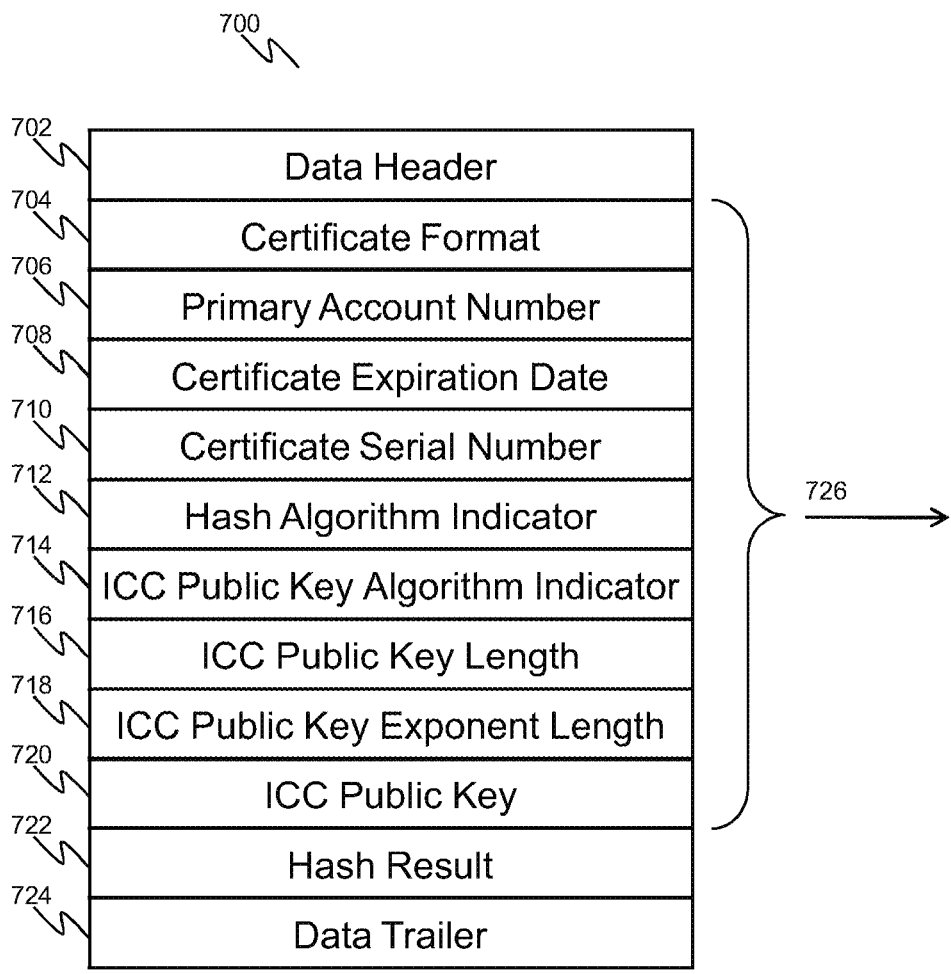
FIG. 7 shows the contents of an ICC Public Key Certificate according to an embodiment of the invention.

FIG. 7 illustrates the data fields contained in an ICC Public Key Certificate.

ICC Public Key Certificate 700 comprises Data Header 702, Certificate Format 704, PAN 706, Certificate Expiration Date 708, Certificate Serial Number 710, Hash Algorithm Indicator 712, ICC Public Key Algorithm Indicator 714, ICC Public Key Length 716, ICC Public Key Exponent Length 718, ICC Public Key 720, Hash Result 722, and Data Trailer 724. There is scope provided within EMV to determine the lifetime of the ICC Public Key Certificate through the use of the Certificate Expiration Date 708. As the ICC Public Key Certificate is signed by the Issuer Private Key, the Certificate Expiration Date 708 cannot be manipulated without knowledge of the Issuer Private Key, which is held secretly by the issuing bank.

As described previously, the Certificate Expiration Date 708 of the ICC Public Key Certificate is recorded in the format of a certificate expiration month and a certificate expiration year. This format is often referred to as MM/YY. However, in order to adequately limit the lifetime of the ICC Public Key Certificate, and thereby reduce the risk associated with a successful attack on the encrypted payment keys, a granularity finer than month-level is required.

In order to achieve a finer granularity than MM/YY, embodiments of the present invention adapt the purpose of the Application Expiration Date (AED) parameter, which is stored in the format of an application expiration day, application expiration month and an application expiration year. This format is often referred to as DD/MM/YY. By repurposing the AED parameter to store a date associated with the expiration of the ICC Public Key Certificate, day-level granularity can be achieved.

However, since the AED is not a field contained in ICC Public Key Certificate 700, the contents of the AED are not signed by the issuer, and hence can potentially be modified without requiring knowledge of the Issuer Private Key if access to the data has been achieved. The contents of the AED can be protected by ensuring that the AED value is included in the static data used when generating Hash Result 722. As described previously, Hash Result 722 is generated on the basis of a concatenation of data fields 726 from the ICC Public Key Certificate, and a number of static data fields as identified in the AFL. Inclusion of the AED in the static data can be ensured by configuring the corresponding record in the AFL, thereby flagging the AED for use in offline data authentication.

Figure 8:
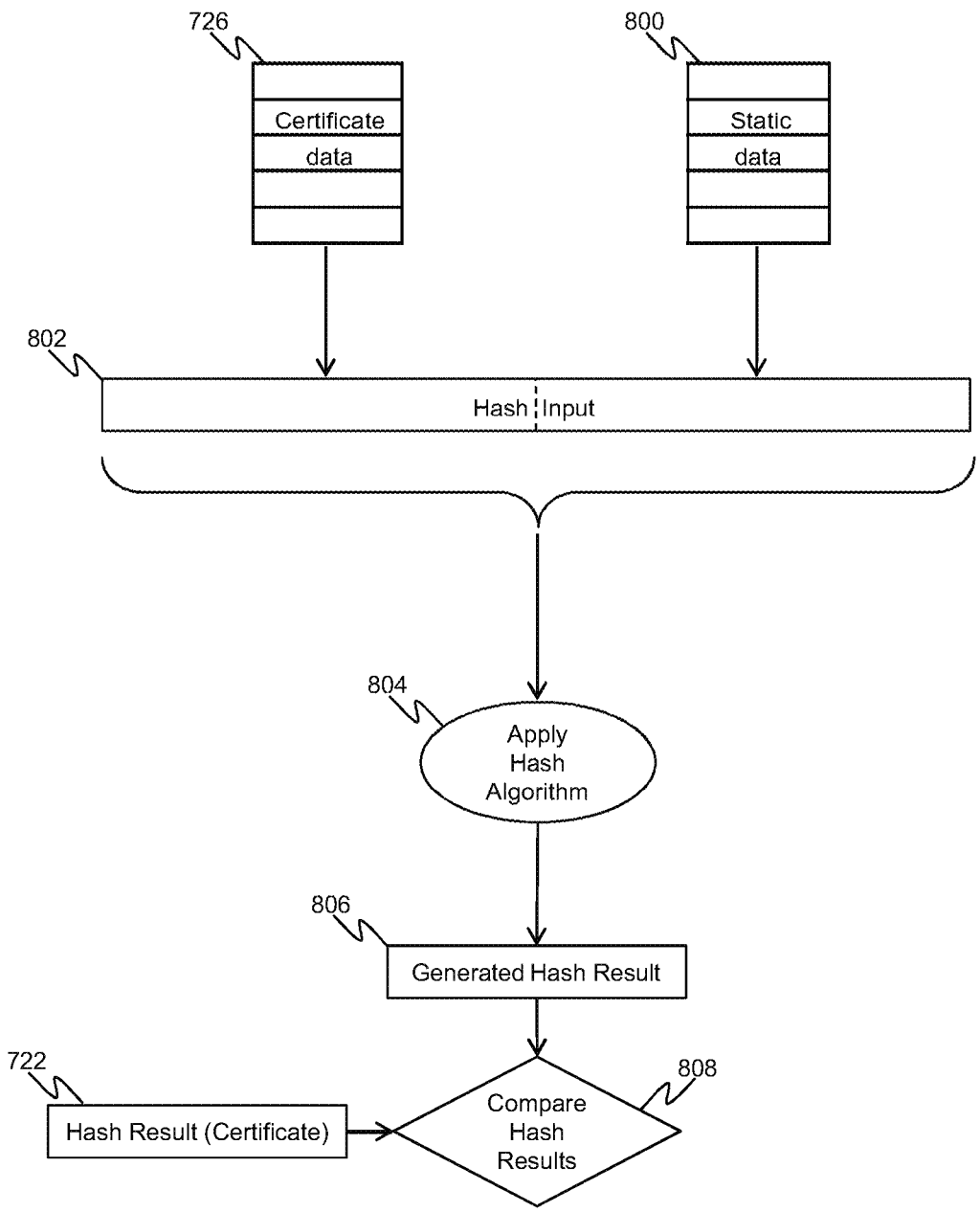
FIG. 8 shows the process of verifying an ICC Public Key Certificate Hash Result.

FIG. 8 illustrates the process of hash verification carried out at the PoS terminal on the basis of the ICC Public Key Certificate data 726 and static data 800.

The content of static data 800 is determined by the contents of the AFL, which according to embodiments of the present invention defines the inclusion of the AED parameter. The certificate data 726 and static data 800 are concatenated to form the hash algorithm input data 802. The hash algorithm is applied in step 804 to generate hash result 806.

The specific hash algorithm to be applied is defined by Hash Algorithm Indicator 712. As mentioned previously, EMV approves the use of SHA-1 as an appropriate hash algorithm.

In order to verify the generated hash result 806, it is compared to the Hash Result 722 obtained from the ICC Public Key Certificate at step 808.

Since Hash Result 722 is signed by the Issuer Private Key, the AED parameter cannot be subsequently modified after the generation of the ICC Public Key Certificate without rendering the ICC Public Key Certificate invalid. If the AED parameter is modified in an attempt to extend the expiration date, the hash result generated at the PoS terminal during offline data authentication will not match the Hash Result 722 contained in the ICC Public Key Certificate, causing the offline data verification to fail.

According to EMV, the AED is compared to the current date in a stage of the transaction processing called Processing Restrictions, which occurs prior to Application Cryptogram generation. If the terminal determines that the AED has expired, the terminal records this by setting the appropriate bit in the TVR, in this case by setting the 'Expired Application Date' bit.

Figure 1:
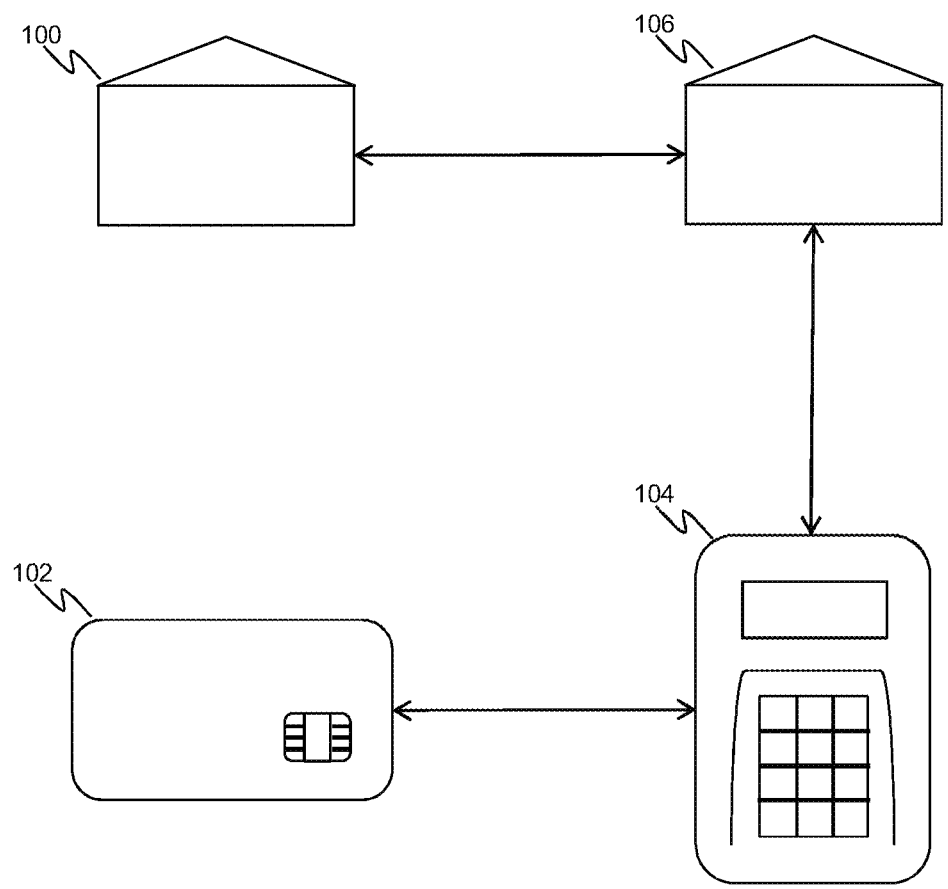
FIG. 1 shows the components of a conventional electronic payment system.
Figure 2:
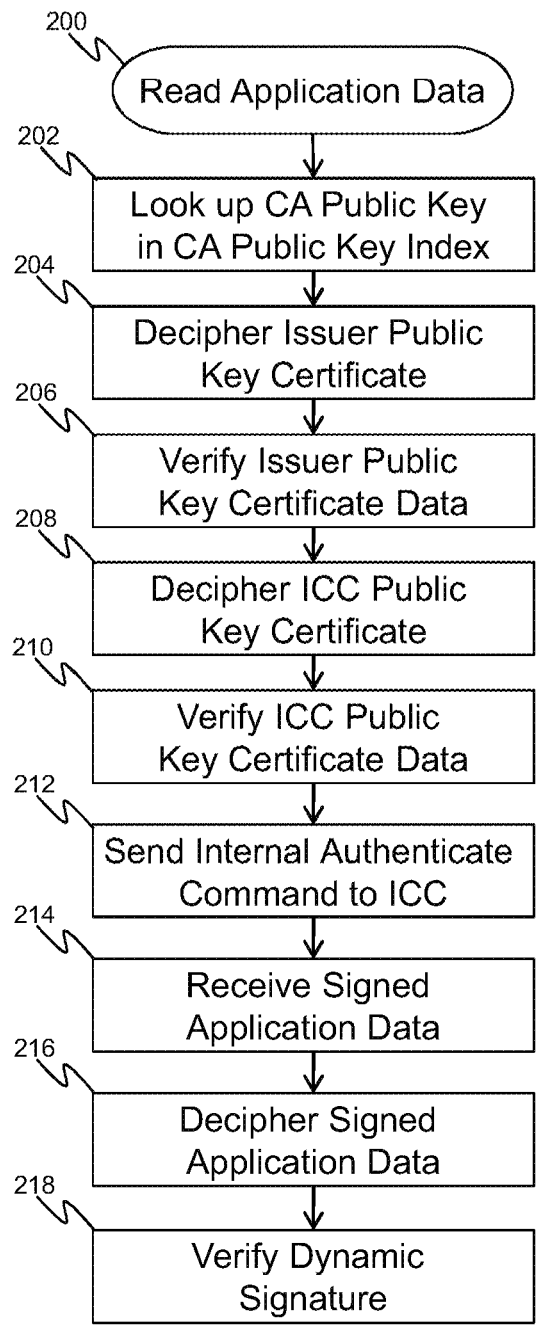
FIG. 2 shows an exemplary DDA flow diagram according to the known EMV transaction protocols.
Figure 3:
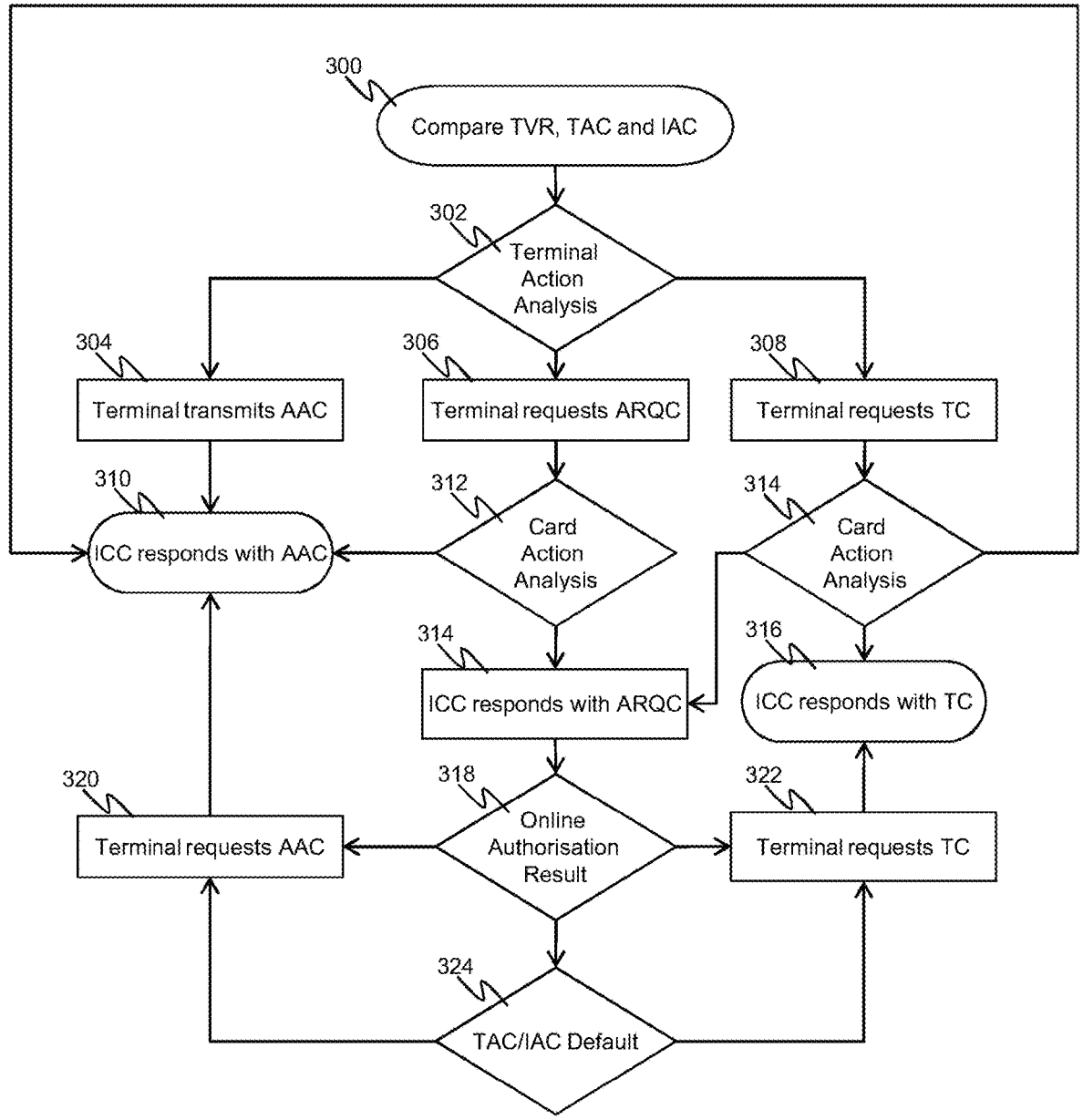
FIG. 3 shows an exemplary Application Cryptogram Generation command flow diagram according to the known EMV transaction protocols.

In order to ensure that a transaction with a payment application containing an expired AED is handled properly, the issuing bank can configure the IAC with the appropriate course of action. By configuring the IAC, the issuer can decide ahead of time whether to force online authorization of a transaction where the AED has passed, or simply reject the transaction offline. This decision is implemented during Terminal Action Analysis, as described previously in relation to FIG. 3.

In order to prevent the payment application becoming permanently inoperable after the AED has passed, embodiments of the present invention utilize the communication interface between the user device and the issuing bank to facilitate the provisioning of further ICC Public Key Certificates, each associated with subsequent AED values. In some arrangements, receipt of a new ICC Public Key Certificate at the user device may cause the previously stored ICC Public Key Certificate to be overwritten.

Given the secrecy of the information being transferred from the issuing bank to the user device, the communication must be carried out according to secure protocols. In one arrangement, the issuing bank and the user device communicate via the internet according to an appropriate secure messaging protocol such as Hypertext Transfer Protocol Secure (HTTPS). In the case of the present invention, the issuing bank and the user device communicate via the mobile telephony network, for example using High-Speed Packet Access (HSPA) and an appropriate secure messaging protocol in order to retrieve the ICC Public Key Certificates and AED values.

The provisioning of a new ICC Public Key Certificate may be triggered by a number of different conditions. In some arrangements, the issuing bank may keep a record of the expiration dates associated with each ICC Public Key Certificate provisioned to the user device. On the basis of this information, the issuing bank may detect when the AED associated with a previously provisioned ICC Public Key Certificate expires, and in response provision a new ICC Public Key Certificate and AED value to the user device. Alternatively, the issuing bank may anticipate the expiration of the current AED and push a new ICC Public Key Certificate to the user device before the date passes, in order to avoid the situation where the communication channel between the user device and the issuing bank is interrupted at the time the current AED expires, rendering the user device without a valid set of payment keys.

In some arrangements, the user device may monitor the current AED value itself. On the basis of the monitored AED value, the user device may detect when the current AED expires, and in response request a new ICC Public Key Certificate and AED value from the issuing bank. Alternatively, the user device may anticipate the passing of the AED and request a new ICC Public Key Certificate and AED value from the issuing bank before the date passes, in order to avoid the situation described above where the user device may be rendered without a valid set of payment keys.

As discussed previously, the lifetime of the ICC Public Key Certificate provisioned to the user device should be configured so as to minimize the risk associated with a successful attack on the encrypted stored data. The lifetime of the ICC Public Key Certificate is the duration between the date of provisioning of the ICC Public Key Certificate to the user device, and the date contained in the corresponding AED parameter.

Also as discussed previously, the viability of a payment application relies on maintaining the confidentiality of a number of the payment keys. Conventionally, the payment keys are deployed on the ICC at the time of issuance, and are fixed for the lifetime of the payment application, which is typically in the region of three years. Due to the use of the secure element in conventional methods, it can be safely assumed that the payment keys will not be compromised within the lifetime of the payment application.

Payment applications deployed in a standard application environment, such as contemplated in embodiments of the present invention, do not benefit from the enhanced protection measures that a secure element can provide for storage and processing of the payment keys. The payment keys are stored within the standard application environment, for example in the ROM or other persistent memory portion, and encrypted in order to help protect against attacks made against the user device with the aim of compromising the payment keys. Alternatively, for devices that include a TEE, the payment keys may be stored in the TEE (either encrypted or unencrypted).

Although encrypting the payment keys provides a certain level of protection against these attacks, this is not equivalent to the level of protection provided by a secure element. In particular, data stored in a standard application environment is susceptible to attacks such as buffer overflow attacks, operating system modification and physical intrusion, against which a secure element is immune. Where the payment keys are stored in a TEE, a higher degree of software protection is provided, but the payment keys remain vulnerable to physical intrusion.

However, by limiting or restricting the usefulness of one or more of the payment keys provided, the risk associated with a successful attack on the encrypted data can be reduced to an acceptable level. Specifically, by reducing the lifetime of one or more of the payment keys, the usefulness of the compromised data after a successful attack is greatly reduced.

A method provided by embodiments of the present invention of limiting the usefulness of one or more of the payment keys relates to the ICC Public Key Certificate utilized in the offline data authentication process as described above. Specifically, the ICC Public Key Certificate is used in the DDA and CDA methods of offline data authentication. The EMV specification provides no method of limiting the usefulness of the ICC Public Key Certificate on a day level granularity in a way that can limit the risk of a successful attack against the encrypted stored data.

A common form of attack against encrypted data is known as a brute force attack. A brute force attack involves systematically checking a large number of possible decryption keys with an aim of eventually discovering the correct key required to decrypt the data. By reducing the valid lifetime of one or more of the payment keys to less than a predicted brute force decryption time required to implement a successful brute force attack against the encrypted data, it is possible to render the brute force attack ineffective. This is because during the time that is required for the brute force attack to succeed, the payment keys that are obtained will no longer be valid in their entirety, and hence cannot be used to complete a payment transaction.

In order to determine a suitable lifetime for the ICC Public Key Certificate, an estimated brute force decryption time for the encrypted data can be calculated. Additionally, consideration may be given to vulnerabilities in any method used to encrypt/decrypt the keys. For example a weak password (such a one with few characters or made up of dictionary words) may yield a lower estimated brute force decryption time. As described previously, by configuring the lifetime of the ICC Public Key Certificate to be less than the predicted brute force decryption time required to implement a successful attack against the encrypted payment keys, it is possible to render a brute force attack ineffective.

The method of the present invention can be equally well employed with the SDA method of offline data authentication by configuring the Signed Static Application Data instead of the ICC Public Key Certificate. The Signed Static Application Data is also signed by the Issuer Private Key; hence the content cannot be altered without knowledge of the Issuer Private Key, which is known only to the issuing bank. The hash result contained in the Signed Static Application Data is also generated on the basis of the static data identified in the AFL. Hence the validity of the AED can be verified in the same way as if DDA or CDA were used. However, the lack of support for dynamic signature generation in SDA limits its use to contact based payment transactions.

As will be appreciated, the foregoing embodiments of the invention relate to offline processing of an EMV transaction; in particular, these embodiments are concerned with the configuration of a user device and repurposing of the AED parameter to store a date associated with the expiration of the ICC Public Key Certificate that enables off-line authorization of such transactions.

Figure 4:
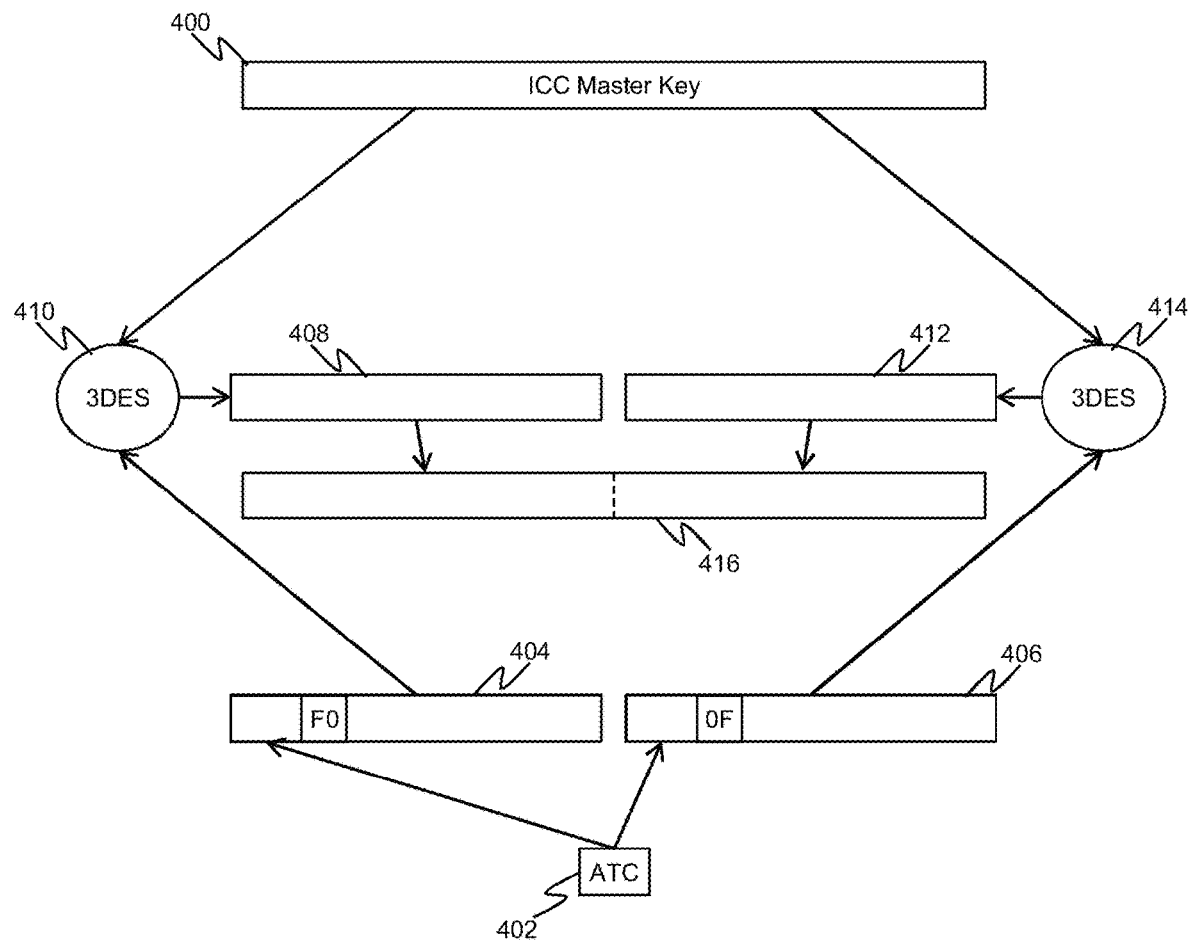
FIG. 4 shows the process of deriving an ICC Session Key from an ICC Master Key according to the known EMV transaction protocols.

According to further embodiments of the invention, the restriction of access to the payment keys can be extended further by configuring the payment application such that the ICC Master Key is not held locally on the user device, and is instead held by a remote entity such as the issuing bank. The issuing bank generates so-called ICC Session Keys that are derived from the ICC Master Key, and issues these keys to the user device, in accordance with, for example, the method described above in relation to FIG. 4. These ICC Session Keys can then be used to perform online authorization of EMV transactions.

An advantage of this embodiment of the invention is that the user device is devolved of both the responsibility and the ability to generate its own ICC Session Keys. Hence a successful attack against the stored encrypted secret data on the user device will result in an attacker obtaining an ICC Session Key that is valid for only a single transaction, not a large number of transactions as would be the case if the ICC Master Key were obtained.

Since an ICC Session Key is valid only for a single transaction, once it has been used to generate the Application Cryptogram(s) required during a single EMV transaction, it is of no further use to the payment application. In some arrangements, after an EMV transaction has been completed, the ICC Session Key is discarded, which may involve the user device purging the stored ICC Session Key from its memory.

Once the provided ICC Session Key has been used to complete a payment transaction, the payment application is no longer equipped to complete an EMV transaction, and as such the payment application can be considered to be in an inoperative state. This is in contrast to the state that the payment application is in when the ICC Session Key is unused, when the payment application can be considered to be in an operative state. The discarding of the ICC Session Key as described previously may form a trigger condition for configuring the payment application into the inoperative state.

In order to prevent the payment application becoming permanently inoperable once the provided ICC Session Key has been used, embodiments of the present invention utilize the communication interface between the user device and the issuing bank to facilitate the provisioning of further ICC Session Keys, as described previously in relation to the provisioning of subsequent ICC Public Key Certificates.

Receipt of a new ICC Session Key at the user device may cause the previously stored ICC Session Key to be overwritten. Alternatively, if the previously used ICC Session Key was discarded after the completion of a transaction, the newly received session key can simply be stored.

In some arrangements, the user device is configured to maintain a store of multiple ICC Session Keys in order to reduce the frequency in which ICC Session Keys must be provisioned to the user device. This allows the user to complete multiple transactions without requiring a corresponding number of communication instances between the user device the issuing bank. This is particularly advantageous if the connection between the user device the issuing bank is interrupted, as the user may proceed with several transactions during this period. Where the user device maintains a store of multiple ICC Session Keys, a used ICC Session Key may be discarded as described above, flagged as used and therefore unavailable for use in future transactions, or merely removed from a maintained index of unused ICC Session Keys.

The provisioning of a new ICC Session Key may be triggered by a number of different conditions. Firstly, the user device may monitor the number of unused ICC Session Keys stored on the user device, and request a new ICC Session Key when all of the available ICC Session Keys have been used. Secondly, the user device may anticipate the depletion of the available ICC Session Keys, and request a new ICC Session Key when the number of available ICC Session Keys falls below a given threshold. This method avoids the situation where the communication channel between the user device and the issuing bank is interrupted when the last ICC Session Key used, rendering the user device without a valid ICC Session Key for subsequent transaction processing.

Additionally, new ICC Session Keys may be provisioned to the device by the issuing bank without requiring a request to be made by the user device. The issuing bank may determine the number of ICC Session Keys that have been used each time a transaction is sent online for explicit authorization by the issuer, and decide whether further ICC Session Keys should be provisioned accordingly. According to some arrangements, the issuing bank may periodically provision new ICC Session Keys to the user device, which will be described in further detail below.

The issuer may keep a record of when each ICC Session Key was provisioned to the user device in order to determine how long ago a given ICC Session Key was provisioned. If a transaction is sent online for authorization, the issuer is able to limit the effective lifespan of the provisioned ICC Session Keys by declining authorization of transactions using ICC Session Keys that were provisioned to the user device before a certain time. In some arrangements, the issuer may utilize a threshold amount of time when determining whether to authorize a transaction, for example by declining authorization of transactions which use an ARQC encoded using an ICC Session Key that was provisioned before a date defined by the threshold amount. The threshold amount of time used by the issuer when determining whether to authorize a transaction can also be referred to as the lifetime of the ICC Session Keys, since an ICC Session Key is stored on the user device for longer than this threshold amount will no longer be accepted for online authorization. The lifetime of an ICC Session Key may be configured by the issuing bank according to a predicted brute force decryption time associated with the encrypted payment keys as discussed above, and may be the same as or different to the lifetime of the ICC Public Key Certificate.

The issuing bank may monitor the amount of time that has elapsed since the provisioning of a previously provisioned ICC Session Key and provision a new ICC Session Key to the user device in response to the amount of time exceeding the threshold amount. Alternatively, the issuing bank may anticipate the amount of time that has elapsed since the provisioning of a previously provisioned ICC Session Key exceeding the threshold amount and provision a new ICC Session Key to the user device before the threshold is passed. As noted above, for the case where the user device anticipates the depletion of the available ICC Session Keys, this has the advantage of avoiding the situation where the communication channel between the user device and the issuing bank is interrupted at the time the threshold is passed, which would otherwise render the user device without a valid ICC Session Key to use in subsequent transactions.

In other arrangements the user device, or more specifically the payment application, may monitor the amount of time that has elapsed since a last ICC Session Key was provisioned in order to detect when the amount of time passes a locally maintained threshold value, and in response request one or more new ICC Session Keys from the issuing bank. This local threshold value may be the same as the value used at the issuing bank, or configured to be sorter, in order to avoid the situation described above where the user device may be rendered without a valid ICC Session Key for use in subsequent transactions.

According to some arrangements, the new ICC Session Keys are provisioned at the same time as new ICC Public Key Certificates in order to minimize the number of unique communication instances required between the user device and the issuing bank. According to alternative arrangements, new ICC Session Keys are provisioned separately to new ICC Public Key Certificates according to distinct trigger conditions.

A new ICC Session Key received in response to a previously provisioned ICC Session Key nearing or exceeding its lifetime, may overwrite the previously provisioned ICC Session Key to ensure that only ICC Session Keys that have not exceeded their lifetime are used in subsequent transaction processing. In some arrangements, the payment application may discard ICC Session Keys that have been stored at the user device for longer than the local threshold value of time. In alternative arrangements, ICC Session Keys may be maintained even after the local threshold has passed, for use in offline transactions.

In order to prevent genuine transactions being declined by the issuer, the issuing bank can provision the user device with new ICC Session Keys on the basis of the threshold amount of time described above, as well as or in place of the criteria described previously.

In some arrangements the ICC Session Keys may be encrypted and stored so as to be inaccessible to the payment application without specific input from the user. In this manner, the ICC Session Keys can be made available to the payment application on a one by one basis and has the advantage of allowing an extra level security to be implemented on the user device by forcing the user to provide the decryption key, for example in the form of a password, before releasing an ICC Session Key to be made available to the payment application. This arrangement also has the additional advantage of requiring any attack made against the encrypted payment keys stored on the user device to decrypt two separately encrypted data portions, one comprising the stored ICC Session Keys, and one comprising the remaining payment keys. Decrypting an ICC Session Key and providing it to the payment application in this way has the effect of configuring the payment application into the operative state, enabling it to conduct an EMV transaction.

Figure 9:
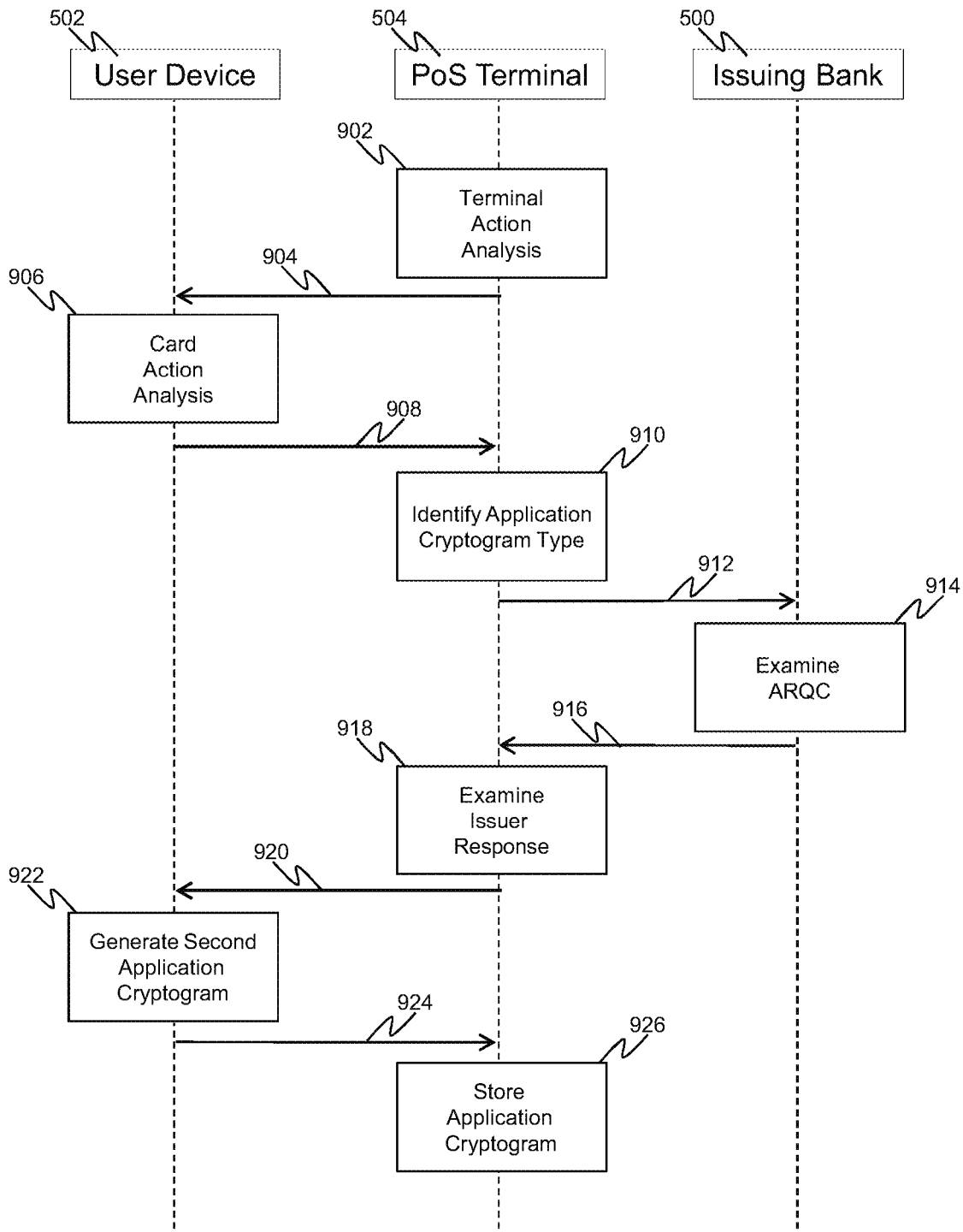
FIG. 9 shows a message flow diagram illustrating an online authorization process according to a further embodiment of the present invention.

FIG. 9 illustrates a message flow diagram for online authorization according to an embodiment of the present invention. The process starts with the PoS terminal 504 performing Terminal Action Analysis (902) to determine how to authorize the transaction. When the Terminal Action Analysis is completed PoS terminal 904 issues a GENERATE AC command to the user device in step 904. In order for a transaction to be authorized online, the terminal 504 must request either a TC or an ARQC. In response to receiving the GENERATE AC command, the user device performs Card Action Analysis in step 906 and responds with an Application Cryptogram in step 908, which in this case is assumed to be an ARQC. An Application Cryptogram is generated on the basis of an aforementioned ICC Session Key and transaction specific data. In response to receiving the Application Cryptogram, the terminal identifies the type of Application Cryptogram sent by the user device in step 910 and forwards the ARQC to the issuer in step 912 for authorization of the transaction.

The issuer then examines the ARQC in step 914 in order to make a decision on whether to authorize the transaction. Optionally, the issuer may identify which Session Key was used to generate the ARQC, determine the amount of time that has passed since that ICC Session Key was provisioned to the user device, and make the decision on whether to authorize the transaction on the basis of whether that amount of time exceeds the aforementioned threshold amount.

The issuer reports its decision to the PoS terminal in step 916, and on the basis of that decision the PoS terminal requests a second Application Cryptogram from the user device in step 920. If the issuer decided to reject the transaction, the terminal requests an AAC from the user device. If the issuer decided to authorize the transaction, the terminal requests a TC from the user device. In response to receiving the request in step 920, the user device generates a second Application Cryptogram in step 922, and sends this to the terminal in step 924. The Application Cryptogram is stored by the terminal in step 926, and the authorization process is complete.

This second method provided by the present invention for limiting the usefulness of one or more of the payment keys relates to the ICC Master Key utilized in the generation of ICC Session Keys for the Application Cryptogram Generation process described above. Conventionally, where the ICC Master Key is provided within the payment application, the payment application is equipped to generate ICC Session Keys as required. The EMV 4.2 specification limits the number of ICC Session Keys that may be generated by an ICC Master Key at 65535, but provides no method of limiting the usefulness of the ICC Master Key beyond this level in a way that can sufficiently limit the risk of a successful attack against the payment keys. However, by holding the ICC Master Key at the issuing bank, and configuring the payment application with a limited number of ICC Session Keys, embodiments of the present invention reduce the risk posed by a successful attack.

By working the two methods in combination, embodiments of the present invention are able to restrict the usability of the payment keys stored on the user device on the basis of an amount of time by configuring the AED parameter and using it when generating the ICC Public Key Certificate Hash Result, and also on a number of uses by storing ICC Session Keys on the user device, and holding the ICC Master Key at a remote entity.

Through the combination of time and usage based limitations on the usability of the private keys, embodiments of the present invention are able to further reduce the risk associated with a successful attack on the encrypted payment keys, such that even if an attack succeeds in less time than the predicted brute force decryption time of the encrypted data, the potential usability of the obtained payment keys is still restricted to a limited number of transactions.

The above embodiments are to be understood as illustrative examples of the invention. Further embodiments of the invention are envisaged. For example, the user device may comprise a mobile telephony device able to communicate with the issuing bank via the mobile telephone network according to one or more mobile network communication protocols, such as High Speed Packet Access (HSPA) or CDMA2000. Further, the user device could be an internet enabled device, able to communicate with the issuing bank via the internet according to one or more packet based communication protocols, such as an appropriate protocol from the Internet Protocol (IP) suite. Additionally, the method of the present invention can be worked by arranging the user device to communicate with an agent of the issuing bank, instead of the issuing bank itself, wherein the agent is equipped with the necessary data required for provisioning to the payment application. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for communicating between a user device and a terminal in a transaction, the method comprising:

receiving, at the terminal from the user device comprising a payment application, an application expiry date parameter associated with the payment application and including an expiration day, an expiration month, and an expiration year, and a certificate having data stored within one or more data fields and a hash in one of the one or more data fields, the application expiry date parameter not being in any data field in the certificate and the application expiry date parameter repurposed to represent an expiration date of the certificate, and wherein the hash is generated by concatenating the application expiry date parameter and at least some of the data stored within the one or more data fields of the certificate;

in response to the receiving the application expiry date parameter and the certificate, concatenating data including the application expiry date parameter and the at least some of the data stored within the one or more data fields of the certificate;

verifying, by the terminal, the hash, by performing a one-way mathematical operation including a hash algorithm on the concatenated data including the application expiry date parameter and the at least some of the data stored within the one or more data fields of the certificate to form another hash, and comparing the hash and the another hash;

determining, by the terminal, that the application expiry date parameter is not expired by comparing the application expiry date parameter to a current date; and in response to determining and verifying, authorizing, by the terminal, the transaction.

2. The method of claim 1, wherein the certificate is an ICC (Integrated Circuit Card) public key certificate and the user device is a mobile phone.

3. The method of claim 1, wherein the data stored within the one or more data fields of the certificate comprises a primary account number associated with the user device, a certificate serial number associated with the certificate, and a hash algorithm indicator that identifies the one-way mathematical operation.

4. The method of claim 1, wherein the application expiry date parameter is not signed by an issuer of the user device.

5. The method of claim 1, wherein the method further comprises provisioning, by an issuer computer, a plurality of certificates and hashes to the user device, each certificate and hash being provisioned based at least in part on an expiration date parameter associated therewith.

6. The method of claim 5, wherein, responsive to the satisfaction of a predetermined criterion, provisioning the user device with a given certificate and a given hash.

7. The method of claim 6, wherein the predetermined criterion comprises a current day, a current month, and a current year matching a given application expiration date, wherein the current date, the current month, and the current year are being maintained by a certificate provisioning entity.

8. The method of claim 6, wherein the predetermined criterion comprises receiving a request of a predetermined type, the request identifying at least the user device.

9. The method of claim 5, wherein the provisioning of the plurality of certificates and the hashes occur via a communications network.

10. The method of claim 1, wherein the certificate expires a predetermined number of days after provisioning of the certificate to the user device based on the application expiry date parameter, the predetermined number of days being less than a predicted brute force decryption time to decrypt encrypted payment keys in the user device.

11. The method of claim 1, wherein the at least some of the data stored within the one or more data fields of the certificate includes a certificate format, a primary account number, a certificate serial number, a hash algorithm indicator, an ICC public key indicator, an ICC public key length, and an ICC public key.

12. The method of claim 1, wherein the terminal is a point-of-sale terminal.

13. The method of claim 1, wherein the hash algorithm is a SHA-1 algorithm.

14. The method of claim 1, wherein the user device includes a first processing portion and a second processing portion, the first processing portion comprising a first application environment within a secure element and the second processing portion comprising a second application environment external to the secure element, and wherein the second processing portion comprises the payment application.

15. The method of claim 14, wherein the user device includes a mobile communications device and the secure element comprises a Subscriber Identity Module.

16. The method of claim 14, wherein the second application environment comprises a Trusted Execution Environment, and wherein the Trusted Execution Environment is configured to store or execute at least part of the payment application.

17. The method of claim 11, wherein the terminal communicates with the user device using a radio frequency communications protocol.

18. A terminal comprising:
a processor; and
a computer readable medium, the computer readable medium comprising code, executable by the processor for performing a method for communicating in a transaction, the method comprising:

receiving, from a user device comprising a payment application, an application expiry date parameter associated with the payment application and including an expiration day, an expiration month, and an expiration year, and a certificate having data stored within one or more data fields and a hash in one of the one or more data fields, the application expiry date parameter not being in any data field in the certificate, and the application expiry date parameter repurposed to represent an expiration date of the certificate, and wherein the hash is generated by concatenating the application expiry date parameter and at least some of the data stored within the one or more data fields of the certificate;

in response to the receiving the application expiry date parameter and the certificate, concatenating data including the application expiry date parameter and the at least some of the data stored within the one or more data fields of the certificate verifying, the hash, by performing a one-way mathematical operation including a hash algorithm on the concatenated data including the application expiry date parameter and the at least some of the data stored within the one or more data fields of the certificate;

determining that the application expiry date parameter is not expired by comparing the application expiry date parameter to a current date; and in response to determining, authorizing the transaction, wherein the data stored within the one or more data fields of the certificate comprises a primary account number associated with the user device, a certificate serial number associated with the certificate, and a hash algorithm indicator that identifies the one-way mathematical operation.

19. The terminal of claim 18, wherein the certificate is an ICC (Integrated Circuit Card) public key certificate and the user device is a mobile phone.

\* \* \* \* \*